United States Patent
Serkh

(10) Patent No.: US 9,291,253 B1
(45) Date of Patent: Mar. 22, 2016

(54) ISOLATING DECOUPLER

(71) Applicant: GATES CORPORATION, Denver, CO (US)

(72) Inventor: Alexander Serkh, Troy, MI (US)

(73) Assignee: GATES CORPORATION, Denver, CO (US)

( * ) Notice: Subject to any disclaimer, the term of this patent is extended or adjusted under 35 U.S.C. 154(b) by 0 days.

(21) Appl. No.: 14/667,463

(22) Filed: Mar. 24, 2015

(51) Int. Cl.
| | |
|---|---|
| F16D 3/00 | (2006.01) |
| F16H 55/14 | (2006.01) |
| F16H 55/36 | (2006.01) |
| F16H 9/00 | (2006.01) |
| F16H 59/00 | (2006.01) |
| F16H 61/00 | (2006.01) |
| F16H 63/00 | (2006.01) |
| F16H 7/02 | (2006.01) |

(52) U.S. Cl.
CPC .................. *F16H 55/36* (2013.01); *F16H 7/02* (2013.01); *F16H 2055/363* (2013.01)

(58) Field of Classification Search
CPC . F16H 55/36; F16H 2055/366; F16D 41/206; F16D 7/022; F02B 67/06
USPC ...................................................... 474/94, 70
See application file for complete search history.

(56) References Cited

U.S. PATENT DOCUMENTS

| | | | |
|---|---|---|---|
| 773,320 A | 10/1904 | Haase, Jr. | |
| 2,396,985 A | 3/1946 | Burrus | |
| 2,551,739 A | 5/1951 | Harlan | |
| 2,633,953 A | 4/1953 | Gorske | |
| 2,794,524 A | 6/1957 | Sacchini et al. | |
| 2,829,748 A | 4/1958 | Sacchini et al. | |
| 2,866,349 A | 12/1958 | Heckethorn | |
| 2,885,896 A | 5/1959 | Hungerford, Jr. et al. | |
| 2,968,380 A | 1/1961 | Sacchini et al. | |
| RE25,229 E | 8/1962 | Sacchini et al. | |
| 3,059,493 A | 10/1962 | Wolfram | |
| 3,242,696 A | 3/1966 | Kaplan | |
| 3,249,190 A | 5/1966 | Botnick | |
| 3,298,486 A | 1/1967 | Perryman | |
| 3,618,730 A | 11/1971 | Mould | |
| 3,968,702 A | 7/1976 | Beaudoin et al. | |

(Continued)

FOREIGN PATENT DOCUMENTS

| | | |
|---|---|---|
| EP | 095842 A1 | 12/1983 |
| EP | 368526 A1 | 5/1990 |

(Continued)

OTHER PUBLICATIONS

Extended European Search Report dated Mar. 5, 2007, for EP application No. 07001751.2.

(Continued)

*Primary Examiner* — Henry Liu
(74) *Attorney, Agent, or Firm* — Jeffrey A. Thurnau, Esq.; Paul N. Dunlap, Esq.

(57) ABSTRACT

An isolating decoupler comprising a shaft, a pulley journalled to the shaft and having a belt bearing surface, the belt bearing surface having a diameter over balls not greater than 2A, a one-way clutch mounted to the shaft, a clutch carrier mounted to the one-way clutch, a torsion spring engaged between the clutch carrier and the pulley, the torsion spring loadable in the unwinding direction, the torsion spring having a diameter not less than 2B, and the torsion spring diameter 2B is greater than the belt bearing surface diameter over balls 2A.

9 Claims, 5 Drawing Sheets

(56) References Cited

U.S. PATENT DOCUMENTS

| | | | |
|---|---|---|---|
| 4,095,479 A | 6/1978 | Lundberg | |
| 4,102,214 A | 7/1978 | Hoff | |
| 4,433,765 A | 2/1984 | Rude et al. | |
| 4,460,076 A | 7/1984 | Yamada | |
| 4,821,390 A | 4/1989 | Seyler | |
| 4,943,264 A | 7/1990 | Whiteman, Jr. | |
| 5,052,981 A | 10/1991 | Robert | |
| 5,139,463 A | 8/1992 | Bytzek et al. | |
| 5,149,309 A | 9/1992 | Guimbretiere | |
| 5,156,573 A | 10/1992 | Bytzek et al. | |
| 5,326,330 A | 7/1994 | Bostelmann | |
| 5,437,205 A | 8/1995 | Tseng | |
| 5,598,913 A | 2/1997 | Monahan et al. | |
| 5,879,254 A | 3/1999 | Tanaka | |
| 6,044,943 A | 4/2000 | Bytzek et al. | |
| 6,083,130 A * | 7/2000 | Mevissen | F02B 67/06 192/107 T |
| 6,119,841 A | 9/2000 | Orlamunder | |
| 6,394,247 B1 | 5/2002 | Monahan et al. | |
| 6,394,248 B1 * | 5/2002 | Monahan | F16D 41/206 192/41 S |
| 6,637,570 B2 | 10/2003 | Miller et al. | |
| 6,676,548 B2 | 1/2004 | Fujiwara | |
| 6,691,846 B2 | 2/2004 | Titus et al. | |
| 6,761,656 B2 | 7/2004 | King et al. | |
| 6,923,303 B2 | 8/2005 | Liston et al. | |
| 7,007,780 B2 | 3/2006 | Arnold et al. | |
| 7,052,420 B2 | 5/2006 | King et al. | |
| 7,153,227 B2 | 12/2006 | Dell et al. | |
| 7,191,880 B2 | 3/2007 | Liston et al. | |
| 7,207,910 B2 | 4/2007 | Dell et al. | |
| 7,591,357 B2 | 9/2009 | Antchak et al. | |
| 7,618,337 B2 | 11/2009 | Jansen et al. | |
| 7,712,592 B2 | 5/2010 | Jansen et al. | |
| 7,766,774 B2 | 8/2010 | Antchak et al. | |
| 7,850,557 B2 | 12/2010 | Moriya et al. | |
| 7,878,315 B2 | 2/2011 | Saito et al. | |
| 7,975,821 B2 * | 7/2011 | Antchak | F16D 7/022 192/41 S |
| 7,985,150 B2 * | 7/2011 | Kamdem | F16D 3/02 474/166 |
| 7,998,008 B2 * | 8/2011 | Kamdem | F16D 41/206 474/161 |
| 8,006,819 B2 | 8/2011 | Dell et al. | |
| 8,021,253 B2 | 9/2011 | Dell et al. | |
| 8,177,669 B2 | 5/2012 | Ishida et al. | |
| 8,192,312 B2 | 6/2012 | Ali et al. | |
| 8,302,753 B2 | 11/2012 | Antchak et al. | |
| 8,419,574 B2 | 4/2013 | Serkh et al. | |
| 8,506,434 B2 | 8/2013 | Harvey | |
| 8,602,928 B2 | 12/2013 | Serkh et al. | |
| 8,678,157 B2 * | 3/2014 | Ward | F16D 7/022 192/41 R |
| 8,888,622 B2 * | 11/2014 | Chen | F16D 41/206 474/74 |
| 8,931,610 B2 * | 1/2015 | Serkh | F16D 41/206 192/41 S |
| 8,944,947 B2 * | 2/2015 | Yamatani | F02N 15/023 474/166 |
| 8,985,293 B2 * | 3/2015 | Marion | F16D 13/76 192/113.32 |
| 9,033,832 B1 * | 5/2015 | Serkh | F16F 15/126 474/70 |
| 2002/0183147 A1 | 12/2002 | Fujiwara | |
| 2005/0215366 A1 * | 9/2005 | Serkh | F02B 67/06 474/74 |
| 2006/0035740 A1 | 2/2006 | Lehtovaara et al. | |
| 2006/0122014 A1 * | 6/2006 | Kamdem | F16D 3/02 474/70 |
| 2006/0144664 A1 | 7/2006 | Antchak et al. | |
| 2006/0264280 A1 | 11/2006 | Dell et al. | |
| 2007/0066426 A1 * | 3/2007 | Kamdem | F16D 41/206 474/94 |
| 2008/0207364 A1 * | 8/2008 | Schebitz | F16F 15/1213 474/94 |
| 2009/0176583 A1 * | 7/2009 | Dell | F16D 3/02 464/40 |
| 2009/0176608 A1 * | 7/2009 | Jansen | F02B 67/06 474/74 |
| 2009/0197719 A1 | 8/2009 | Ali et al. | |
| 2010/0116617 A1 | 5/2010 | Serkh et al. | |
| 2011/0065537 A1 * | 3/2011 | Serkh | F16D 7/022 474/94 |
| 2011/0224038 A1 | 9/2011 | Aantchak et al. | |
| 2011/0245000 A1 | 10/2011 | Serkh et al. | |
| 2012/0088616 A1 | 4/2012 | Ali et al. | |
| 2013/0092501 A1 * | 4/2013 | Schneider | F16D 7/022 192/41 S |
| 2013/0150191 A1 * | 6/2013 | Ishida | F16D 7/028 474/94 |
| 2015/0252884 A1 * | 9/2015 | Serkh | F16H 55/36 474/94 |

FOREIGN PATENT DOCUMENTS

| | | | |
|---|---|---|---|
| EP | 1279807 A1 | 1/2003 | |
| EP | 1534972 B1 | 1/2008 | |
| GB | 2211565 A | 7/1989 | |
| JP | 9953649 A | 2/1997 | |
| JP | 9144769 A | 6/1997 | |
| JP | 10030450 A | 2/1998 | |
| JP | 2002249794 A | 9/2002 | |
| WO | 0192741 A1 | 12/2001 | |
| WO | 0192746 A1 | 12/2001 | |
| WO | 03/048606 A1 | 6/2003 | |
| WO | 2005/057037 A1 | 6/2005 | |
| WO | 2011160208 A1 | 12/2011 | |

OTHER PUBLICATIONS

Minutes from oral proceedings conducted at EPO on Jun. 21, 2007 in EP application No. 03 771 041.5.
European Patent Office, Communication pursuant to Article 96(2) EPC, dated May 5, 2006 in EP application No. 03 771 041.5.
European Patent Office, Communication pursuant to Article 96(2) EPC, dated Jun. 24, 2005 in EP application No. 03 771 041.5.

* cited by examiner

ISOLATING DECOUPLER

FIELD OF THE INVENTION

The invention relates to an isolating decoupler, and more particularly, to an isolating decoupler having a torsion spring with a diameter greater than a diameter of a belt bearing surface.

BACKGROUND OF THE INVENTION

This invention relates to alternator tuning devices, particularly to isolating decouplers using a torsion spring for isolation. The function and utility of isolating decoupler tuning devices is commonly known. A typical device comprises multiple components including an isolating spring, one way clutch, bearing(s), a pulley and other ancillary parts. The need for each of these components typically requires the overall diameter of the device to exceed what the industry desires. Decreasing automotive engine sizes and ever increasing fuel efficiency requirements indicate that isolating decoupler diameters can be an engine development limiting factor.

A size limiting relationship is that between the pulley and a torsion spring. In the prior art devices the torsion spring is typically in a radial "stack" disposed between the shaft and the pulley. This arrangement tends to increase the diameter of the pulley depending upon the spring rate of the torsion spring.

Representative of the art is U.S. Pat. No. 6,083,130, which discloses a serpentine belt drive system for an automotive vehicle comprising a drive assembly including an internal combustion engine having an output shaft with a driving pulley thereon rotatable about a driving pulley axis. A sequence of driven assemblies each has a driven pulley rotatable about an axis parallel with the driving pulley axis and a serpentine belt mounted in cooperating relation with the driving pulley and with the driven pulleys in a sequence which corresponds with the sequence of the driven assemblies when related to the direction of movement of the belt to cause said driven pulleys to rotate in response to the rotation of the driving pulley. The sequence of driven assemblies includes an alternator assembly including an alternator shaft mounted for rotation about a shaft axis. A hub structure is fixedly carried by the alternator shaft for rotation therewith about the shaft axis. A spring and one-way clutch mechanism couples the alternator pulley with the hub structure. The spring and one-way clutch mechanism comprises a resilient spring member separately formed from and connected in series with a one-way clutch member. The resilient spring member is constructed and arranged to transmit the driven rotational movements of the alternator pulley by the serpentine belt to the hub structure such that the alternator shaft is rotated in the same direction as the alternator pulley while being capable of instantaneous relative resilient movements in opposite directions with respect to the alternator pulley during the driven rotational movement thereof. The one-way clutch member is constructed and arranged to allow the hub structure and hence the alternator shaft to rotate at a speed in excess of the rotational speed of the alternator pulley when the speed of the engine output shaft is decelerated to an extent sufficient to establish the torque between the alternator pulley and the hub structure at a predetermined negative level.

What is needed is an isolating decoupler having a torsion spring with a diameter greater than a diameter of a belt bearing surface. The present invention meets this need.

SUMMARY OF THE INVENTION

The primary aspect of the invention is an isolating decoupler having a torsion spring with a diameter greater than a diameter of a belt bearing surface.

Other aspects of the invention will be pointed out or made obvious by the following description of the invention and the accompanying drawings.

The invention comprises an isolating decoupler comprising a shaft, a pulley journalled to the shaft and having a belt bearing surface, the belt bearing surface having a diameter over balls not greater than 2A, a one-way clutch mounted to the shaft, a clutch carrier mounted to the one-way clutch, a torsion spring engaged between the clutch carrier and the pulley, the torsion spring loadable in the unwinding direction, the torsion spring having a diameter not less than 2B, and the torsion spring diameter 2B is greater than the belt bearing surface diameter over balls 2A.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
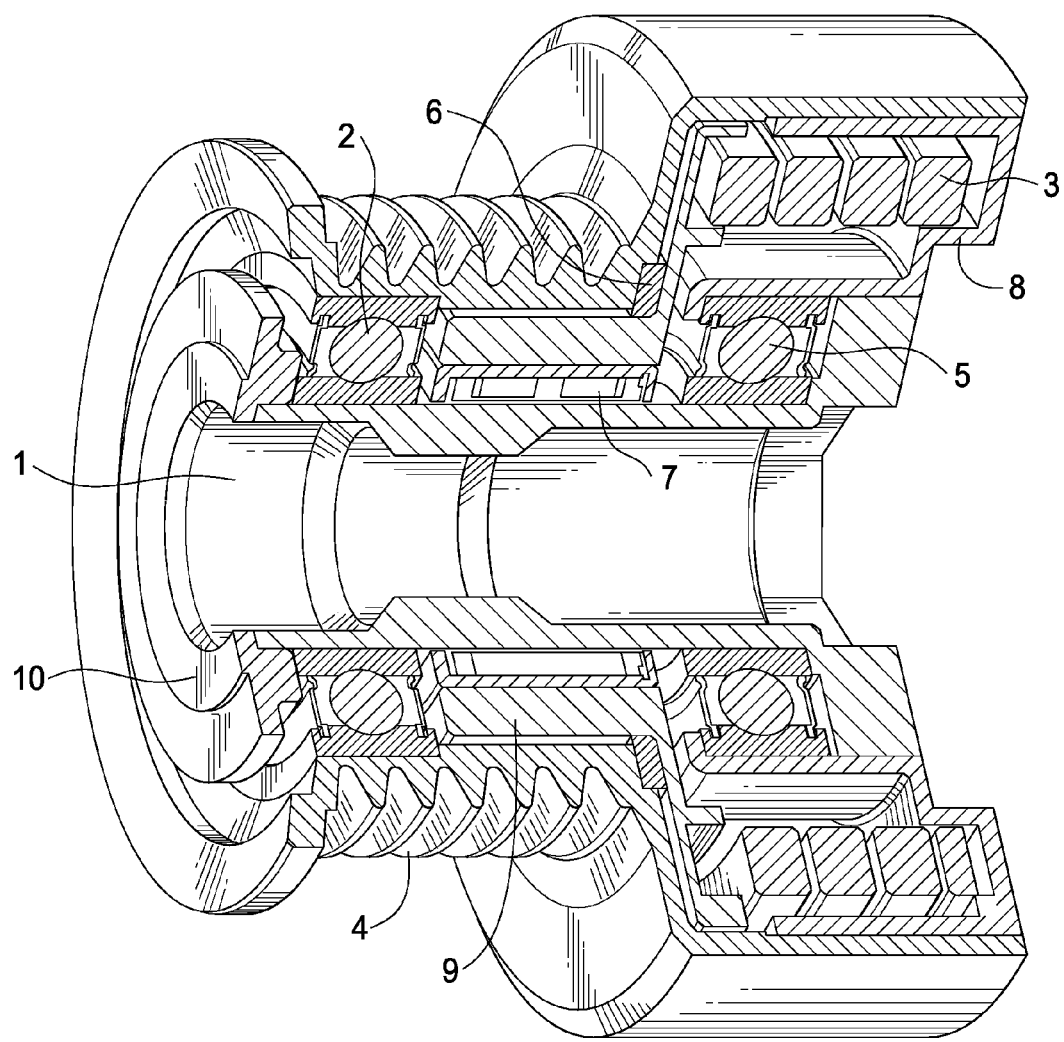
FIG. 1 is a perspective cross section view.

FIG. 1 is a perspective cross section view. The inventive isolating decoupler device 14 comprises a pulley 4, bearing 2 and bearing 5, torsion spring 3, one-way clutch 7, shaft 1, thrust bushing 6, clutch carrier 9, spring retainer 8 and a slinger 10.

Pulley 4 is journalled to shaft 1 on bearing 2. Spring retainer 8 is journalled to shaft 1 on bearing 5. Spring retainer 8 is press fit into pulley 4, hence pulley 4 is journalled to shaft 1 on bearing 2 and bearing 5. Torsion spring 3 is contained in its entirety within pulley portion 42. Portion 42 is concave toward shaft 1. Portion 42 is axially adjacent to belt bearing surface 41. A belt 30 engages belt bearing surface 41.

Clutch carrier 9 is mounted to one-way clutch 7. One-way clutch 7 is mounted to shaft 1. Thrust bushing 6 is disposed between pulley 4 and clutch carrier 9. One-way clutch 7 axially locates clutch carrier 9 on shaft 1. Pulley 4 is axially located between bearing 2 and thrust bushing 6.

Spring 3 is engaged between clutch carrier 9 and spring retainer 8. End 31 engages clutch carrier 9 and end 32 engages spring retainer 8.

A driven alternator possesses significant inertia. In an overrun condition or during an engine speed decrease, due to inertia the alternator shaft 120 will try to spin faster that it is being driven by the belt, in effect driving the engine through the crankshaft. This is not desirable. To avoid this problem one-way clutch 7 will temporarily disengage thereby allowing alternator shaft 120 to spin down at its own rate. As the rotational speed of shaft 120 decreases to that of the belt input, one-way clutch 7 will re-engage.

In operation torque is transmitted from pulley 4 to spring retainer 8 through torsion spring 3 to clutch carrier 9 to one-way clutch 7 and to shaft 1. One-way clutch 7 in this device can be of any known kind, for example, a roller type or sprague style.

Figure 2:
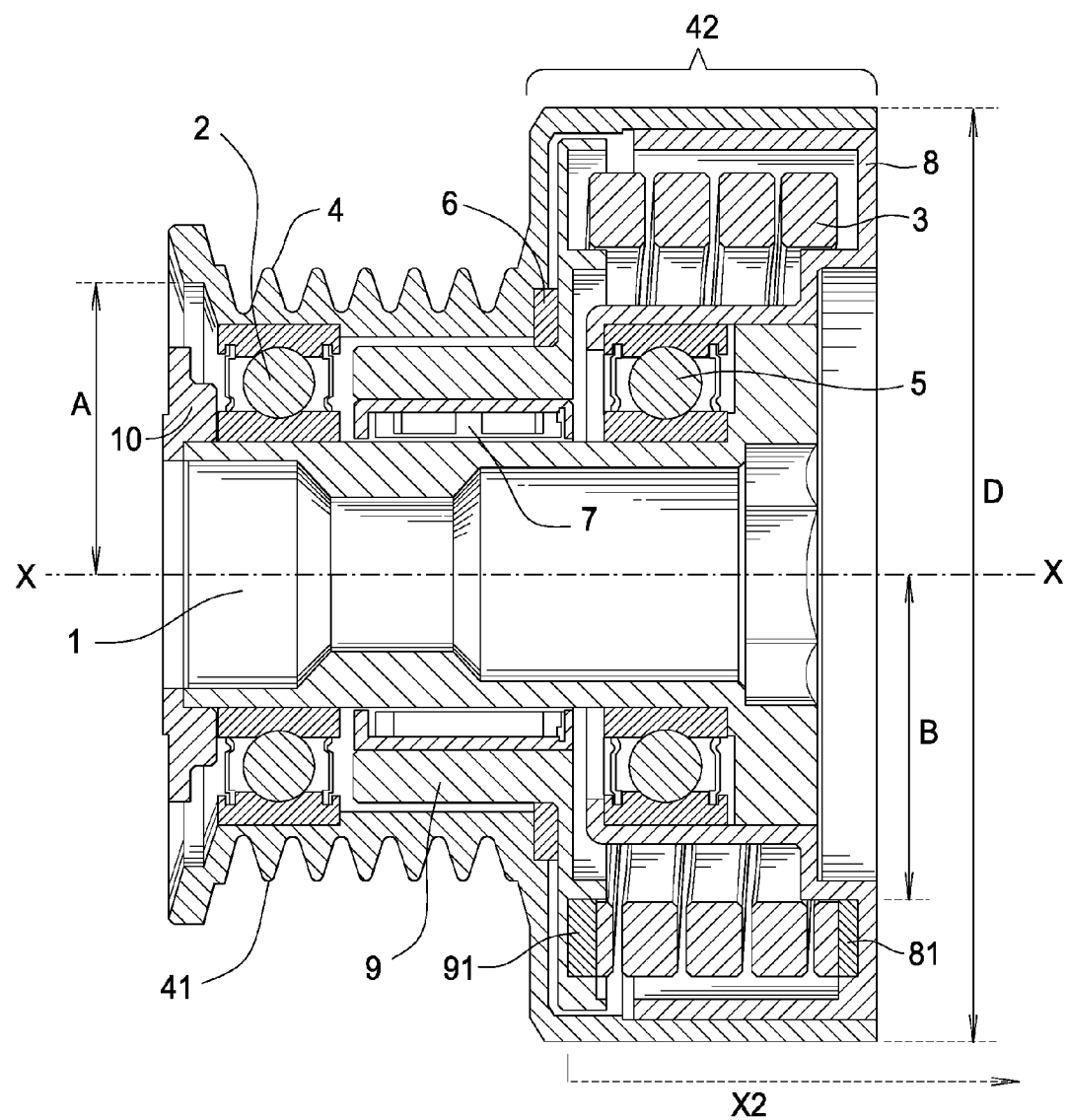
FIG. 2 is a cross section view.

FIG. 2 is a cross section view. An inventive aspect of this device is related to the location of torsion spring 3 in relationship to pulley 4. Due to axial length constraints on the device a spring 3 is typically disposed between the shaft 1 and belt bearing surface 41. In the inventive device spring 3 is not disposed between belt bearing surface 41 and shaft 1, thereby allowing improved packaging of the components and a smaller diameter over balls for belt bearing surface 41. Instead, spring 3 is axially adjacent to the belt bearing surface. Spring 3 and belt bearing surface 41 do not axially overlap.

It is known in the art that pulley diameters are measured using the method referred to as "diameter over balls". This may also be referred to as radius over balls in this specification. For a description see paragraph 4.1 of SAE Surface Vehicle Standard J1459 for V-ribbed belts and pulleys.

Radius B of torsion spring 3 is greater than the radius A over balls of belt bearing surface 41 of pulley 4. The diameter (2× radius A) of surface 41 is not greater than 2A. In the relaxed state torsion spring 3 comprises a cylindrical form, hence the diameter of torsion spring 3 is constant in an axial direction X-X. The entirety of the cylindrical form of torsion spring 3 comprises an inside diameter (ID) of not less than 2B. The entirety of torsion spring 3 is located radially outward of the pulley belt bearing surface 41 since: B>A. This allows the pulley belt bearing surface diameter over balls 2A to be as small as may be required by a user application. It also allows greater control over the design and operating characteristics of the device since spring 3 has a uniform diameter 2B along its entire length instead of spiraling radially outward from a shaft. It also results in the overall diameter D of the inventive device being typically less than an overall diameter compared to a device using a spring which spirals radially outward from a hub. For a prior art example see FIG. 13A of U.S. Pat. No. 6,083,130 which discloses a torsion wire spring having a circular cross-sectional configuration that is spirally wound about an annular hub. A radially inner end of the spring is fixed in any conventional fashion to the hub. The radially outer end portion of the torsion spring is fixed to a carrier plate which is radially outward of the spring.

By way of example the pulley belt bearing surface diameter over balls A for surface 41 can be as small as 45 mm. "A" and "B" are each measured in relation to axis of rotation X-X. In an alternate embodiment B≥A.

A further characteristic of the inventive device is the spring rate of the torsion spring 3. Spring rate values are typically in the range of approximately 0.24 Nm/degree to approximately 0.45 Nm/degree. Torsion spring 3 used in an unwinding loading application can have the following characteristics:

Nominal diameter=ID=51.5 mm=2B
Wire width=4.0 mm
Wire height=5.48 mm
Spring length=16 mm to 26 mm
Spring rate=0.24 Nm/degree to 0.45 Nm/degree These numbers are by way of example only and are not intended to limit the scope of the invention. Unwinding loading refers to loading the torsion spring 3 in the unwinding direction whereby the spring coils radially expand as they are loaded when the device is in use transmitting torque.

The end to end length of a device using the noted spring 3 will be acceptable for most applications. Axially displacing torsion spring 3 from the belt bearing surface causes the axial length of the device to extend in a direction ×2. The axial space within portion 42 can accommodate a torsion spring with a greater spring rate if desired. It can also accommodate a torsion spring with a greater overall length of wire in the event a greater given diameter is needed for a desired number of coils.

Figure 3:
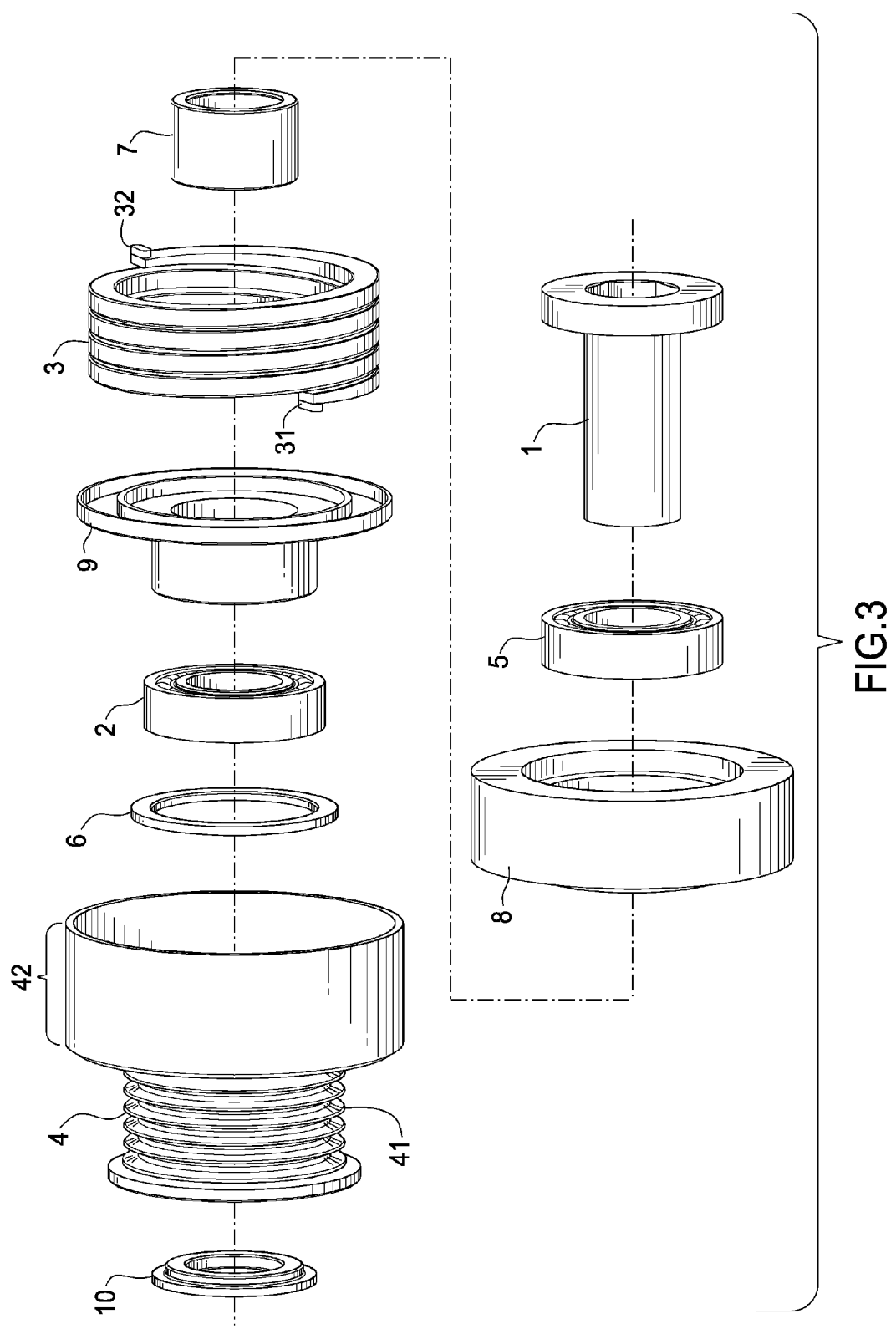
FIG. 3 is an exploded view.

FIG. 3 is an exploded view. Slinger 10, press fit to shaft 1, is used to eject debris from the device. Surface 41 accommodates a multi-ribbed belt.

Figure 4:
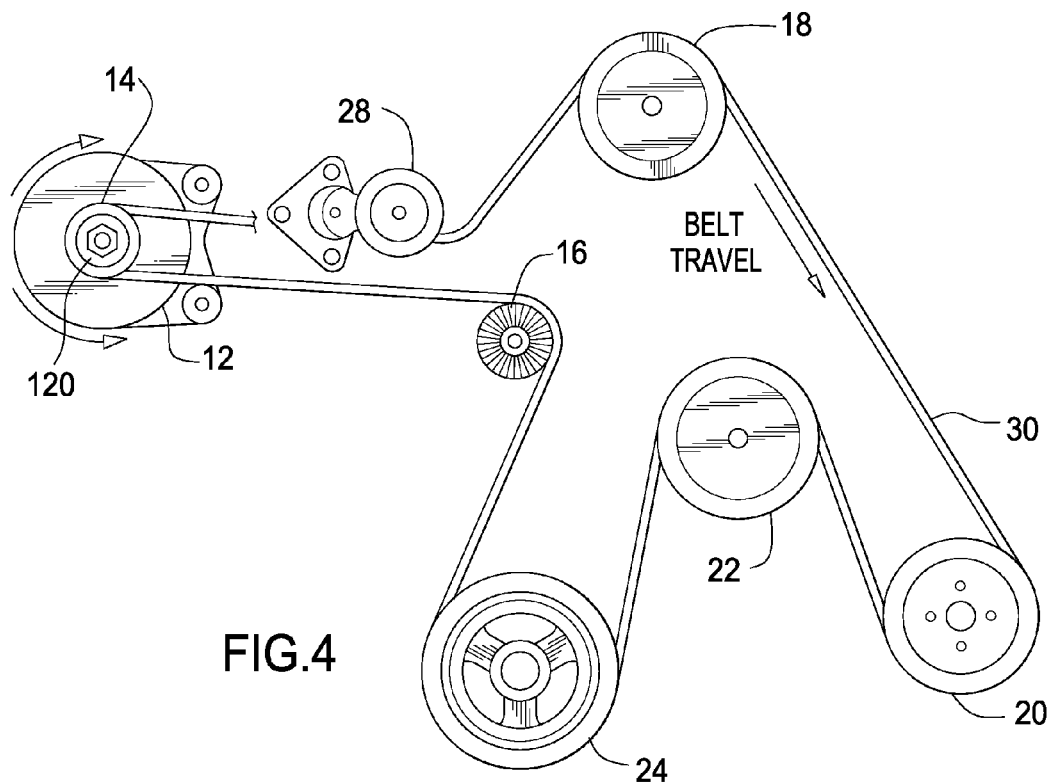
FIG. 4 is a diagram of an engine belt drive system.

FIG. 4 is a diagram of an engine belt drive system. In this example arrangement, a multi-ribbed belt 30 is trained between the pulleys for the power steering pump 20, water pump 22, engine crankshaft 24, alternator 12 and air conditioner compressor 18. A tensioner 28 maintains a preload on belt 30 to avoid belt slip. Idler 16 further routes belt 30 and ensures proper engagement with the pulley on inventive device 14 and pulley 24. Isolating decoupler 14 is attached to a shaft 120 of alternator 12. The described components, excluding the specific inventive device 14, comprise a typical accessory drive system as found on most vehicle engines. The accessories drive or comprise various known engine and vehicle systems including cooling, air conditioning, electrical, and hydraulic for steering.

Crankshaft 24 drives belt 30, which in turn drives alternator 12 and the other accessories. Each of the accessories is typically mounted to the front of a vehicle internal combustion engine (not shown). In an overrun condition or during engine deceleration the inventive device 14 will disengage the alternator from the accessory drive system.

Figure 5:
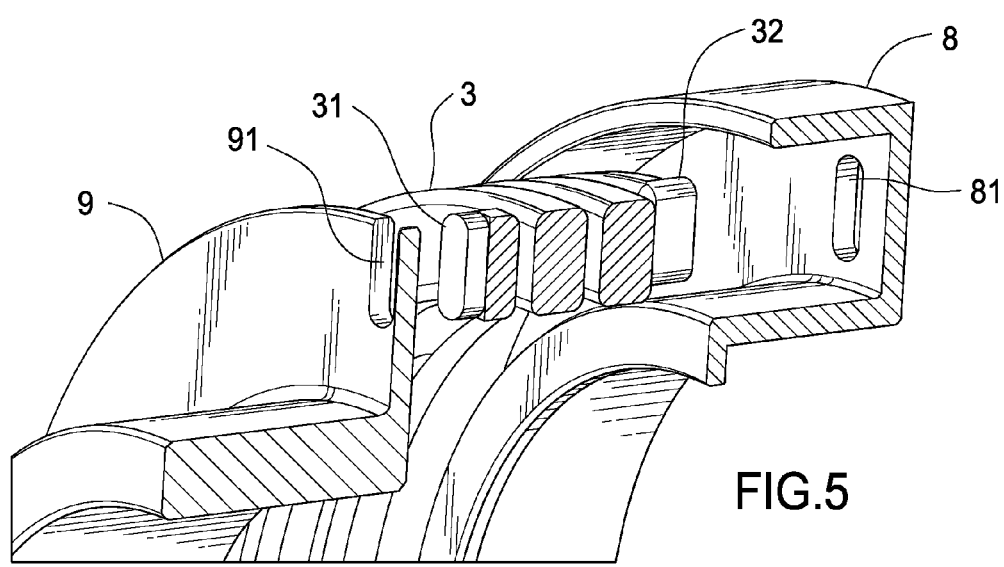
FIG. 5 is a partial cross-sectional view of the spring.

FIG. 5 is a partial cross-sectional view of the spring. Spring 3 comprises an end 31 and an end 32. End 31 engages receiving portion 91 in clutch carrier 9. End 32 engages receiving portion 81 in spring retainer 8. This lockingly engages each end of the spring to the clutch carrier and the spring retainer. The locking engagement of each end 31, 32 allows spring 3 to be loaded in either the winding or unwinding direction.

Figure 6:
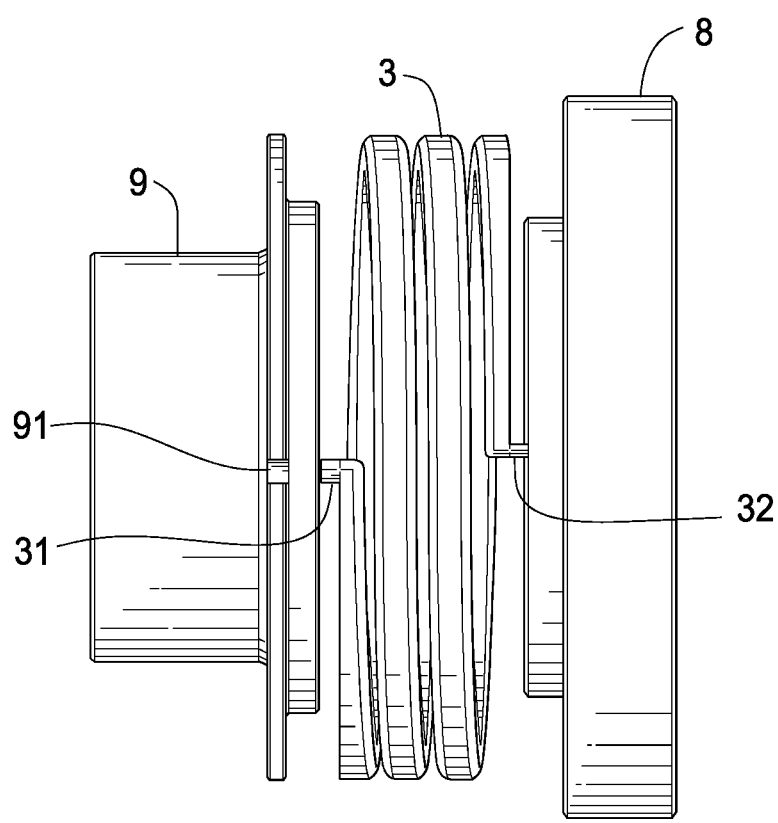
FIG. 6 is a partial exploded view of the spring assembly.

FIG. 6 is a partial exploded view of the spring assembly. Spring 3 is contained between clutch carrier 9 and spring retainer 8.

Although a form of the invention has been described herein, it will be obvious to those skilled in the art that variations may be made in the construction and relation of parts without departing from the spirit and scope of the invention described herein.

I claim:

1. An isolating decoupler comprising:
   a shaft (1);
   a pulley (4) journalled to the shaft and having a belt bearing surface (41), the belt bearing surface having a diameter over balls not greater than 2A;
   a one-way clutch (7) mounted to the shaft;
   a clutch carrier (9) mounted to the one-way clutch;
   a torsion spring (3) engaged between the clutch carrier and the pulley, the torsion spring loadable in the unwinding direction;
   the torsion spring having a diameter not less than 2B; and
   the torsion spring diameter 2B is greater than the belt bearing surface diameter over balls 2A.

2. The isolating decoupler as in claim 1 mounted to a driven device.

3. The isolating decoupler as in claim 1, wherein the torsion spring diameter is constant along an axial length.

4. The isolating decoupler as in claim 1, wherein the pulley further comprises a concave portion disposed adjacent to the belt bearing surface for receiving the torsion spring.

5. The isolating decoupler as in claim 1, wherein the belt bearing surface comprises a multiple ribbed surface.

6. The isolating decoupler as in claim 1, wherein the torsion spring further comprises a first end and a second end for lockingly engaging the clutch carrier and the shaft.

7. An belt drive system comprising:
an isolating decoupler comprising;
  a shaft;
  a pulley journalled to the shaft and having a pulley belt bearing surface, the pulley belt bearing surface having a diameter over balls not greater than 2A;
  a one-way clutch mounted to the shaft;
  a clutch carrier mounted to the one-way clutch;
  a torsion spring engaged between the clutch carrier and the pulley, the torsion spring loaded in the unwinding direction;
  the torsion spring having a diameter not less than 2B;
  the torsion spring diameter 2B is greater than the pulley belt bearing surface diameter over balls 2A;
  the isolating decoupler mounted to a driven load; and
  the driven load driven by a belt.

8. An isolating decoupler comprising:
a shaft;
  a pulley journalled to the shaft and having a belt bearing surface, the belt bearing surface having a diameter over balls not greater than 2A;
  a one-way clutch mounted to the shaft;
  a clutch carrier mounted to the one-way clutch;
  a torsion spring engaged between the clutch carrier and the pulley;
  the pulley comprises a portion disposed adjacent to the belt bearing surface for receiving the torsion spring;
  the torsion spring having a constant diameter not less than 2B; and
  the torsion spring diameter 2B is greater than the belt bearing surface diameter over balls 2A.

9. The isolating decoupler as in claim 8, wherein:
the torsion spring further comprises a first end for lockingly engaging the clutch carrier and a second end for lockingly engaging the shaft.

* * * * *